US010055367B2

(12) United States Patent
Stapleton

(10) Patent No.: US 10,055,367 B2
(45) Date of Patent: Aug. 21, 2018

(54) INTEGRATED-CIRCUIT RADIO

(71) Applicant: Nordic Semiconductor ASA, Trondheim (NO)

(72) Inventor: David Joel Stapleton, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 52 days.

(21) Appl. No.: 15/029,586

(22) PCT Filed: Nov. 20, 2014

(86) PCT No.: PCT/GB2014/053441
§ 371 (c)(1),
(2) Date: Apr. 14, 2016

(87) PCT Pub. No.: WO2015/097426
PCT Pub. Date: Jul. 2, 2015

(65) Prior Publication Data
US 2016/0267030 A1 Sep. 15, 2016

(30) Foreign Application Priority Data

Dec. 23, 2013 (GB) .................................. 1322836.6

(51) Int. Cl.
*G06F 13/24* (2006.01)
*G06F 9/445* (2018.01)
(Continued)

(52) U.S. Cl.
CPC .............. *G06F 13/24* (2013.01); *G06F 9/445* (2013.01); *G06F 9/4812* (2013.01); *G06F 13/26* (2013.01)

(58) Field of Classification Search
None
See application file for complete search history.

(56) References Cited

U.S. PATENT DOCUMENTS 5,916,308 A 6/1999 Duncan et al.
6,223,275 B1 4/2001 Goto et al.
(Continued)

FOREIGN PATENT DOCUMENTS

CA 2143488 8/1996
CN 1625094 A 6/2005
(Continued)

OTHER PUBLICATIONS

"Application Note 179, Cortex™-M3 Embedded Software Development," ARM, pp. 1-24, Mar. 2007.
(Continued)

*Primary Examiner* — Henry Tsai
*Assistant Examiner* — Aurangzeb Hassan
(74) *Attorney, Agent, or Firm* — Klarquist Sparkman, LLP

(57) ABSTRACT

An integrated-circuit radio communication device (1) comprises a processor (7) having a hardware-interrupt input line; memory (13); radio communication logic (17); and interrupt-interface logic (8). The memory (13) contains a firmware module (23) comprising (i) instructions (31) for controlling the radio communication logic (17) according to a predetermined radio protocol, and (ii) an interrupt routine comprising instructions for receiving an identification of a radio communication function in the firmware module (23) and for invoking the identified radio communication function. The interrupt-interface logic (8) comprises input logic for receiving a signal generated by software (27) executing on the device (1), and output logic arranged to assert the hardware-interrupt input line of the processor (7) in response to receiving a software-generated signal at the input logic. The device (1) is configured to invoke the interrupt routine in response to an assertion of the hardware-interrupt input line of the processor (7).

41 Claims, 11 Drawing Sheets

(51) Int. Cl.
  *G06F 9/48* (2006.01)
  *G06F 13/26* (2006.01)

(56) References Cited

U.S. PATENT DOCUMENTS

| | | | |
|---|---|---|---|
| 6,874,069 | B2 | 3/2005 | Lin et al. |
| 7,237,121 | B2 | 6/2007 | Cammack et al. |
| 8,127,064 | B2 | 2/2012 | Girard et al. |
| 8,176,488 | B1 | 5/2012 | Dobrovolskiy et al. |
| 9,317,348 | B2* | 4/2016 | Stapleton ............... G06F 9/547 |
| 9,762,441 | B2* | 9/2017 | Kayargadde ........ H04L 41/0823 |
| 9,891,908 | B2* | 2/2018 | Tverdal .................... G06F 8/66 |
| 2003/0056107 | A1 | 3/2003 | Cammack et al. |
| 2005/0094530 | A1 | 5/2005 | Nakagawa et al. |
| 2005/0177667 | A1 | 8/2005 | Kimelman et al. |
| 2005/0193156 | A1 | 9/2005 | Inoue et al. |
| 2006/0150255 | A1 | 7/2006 | Ceskutti |
| 2008/0126779 | A1 | 5/2008 | Smith |
| 2009/0157936 | A1 | 6/2009 | Goss et al. |
| 2009/0318078 | A1 | 12/2009 | Girard et al. |
| 2011/0117956 | A1 | 5/2011 | Levi et al. |
| 2012/0255031 | A1 | 10/2012 | Sallam |
| 2012/0304120 | A1 | 11/2012 | Gelling |
| 2014/0006692 | A1* | 1/2014 | Berntsen ............ G06F 12/0246 711/103 |
| 2014/0007141 | A1 | 1/2014 | Stapleton |
| 2016/0196170 | A1* | 7/2016 | Stapleton ................. G06F 8/65 719/330 |
| 2017/0064651 | A1* | 3/2017 | Volkov ................ H04W 56/001 |

FOREIGN PATENT DOCUMENTS

| | | |
|---|---|---|
| DE | 3632139 A1 | 4/1988 |
| EP | 1014263 | 6/2000 |
| GB | 2503471 A | 1/2014 |

OTHER PUBLICATIONS

International Search Report and Written Opinion issued by European Patent Office, for PCT/GB2014/053441, 12 pp., Feb. 17, 2015.
Lee et al., "Zikimi: A Case Study in Micro Kernel Design for Multimedia Applications," *Multimedia Tools and Applications*, vol. 27, Issue 3, pp. 351-366, Dec. 2005.
"nRF51 Series Reference Manual v1.1," Nordic Semiconductor, pp. 1-175, Mar. 8, 2013.
"Open AT® OS The Standard C Wireless Operating System," Wavecom, 4 pp., Jun. 2007.
"Open AT® Tutorial," Sierra Wireless, 508 pp., © 2012.
Wikipedia: "Interrupt," Dec. 6, 2013, XP002735543, http://en.wikipedia.org/w/index.php?title=Interrupt%oldid=584871111, 7 pp., (retrieved Feb. 4, 2015).
Office Action (including English translation) from Taiwan Intellectual Property Office for corresponding Taiwan Patent Application 103140369, dated May 8, 2018, 18 pages.

* cited by examiner

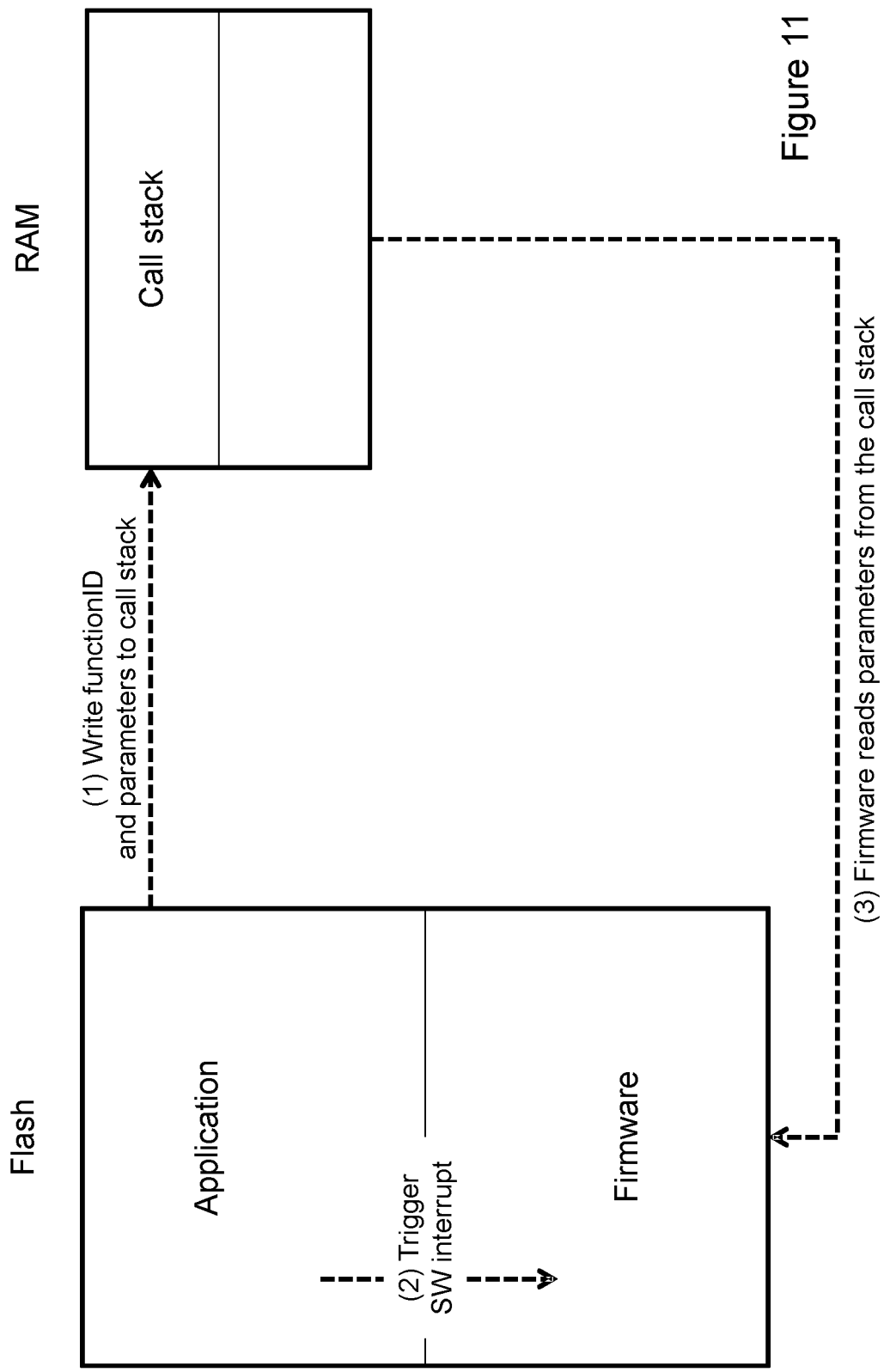

INTEGRATED-CIRCUIT RADIO

CROSS REFERENCE TO RELATED APPLICATIONS

This is the U.S. National Stage of International Application No. PCT/GB2014/053441, filed Nov. 20, 2014, which was published in English under PCT Article 21(2), which in turn claims priority to GB Patent Application 1322836.6, filed Dec. 23, 2013. The priority application is incorporated herein in its entirety.

This invention relates to integrated-circuit radio-communication devices and methods of configuring such devices.

Integrated-circuit radio-communication devices typically integrate a processor, memory and radio communication logic on a silicon chip. An antenna may be fabricated on the silicon or may be connecting externally. The device will normally have pins for connecting it to a power supply, clock source and any external peripherals such as sensors, timers, digital-to-analog converters and output devices. The processor interfaces with the radio communication logic in order to manage the sending and/or receiving of radio messages by the device.

Such radio-communication devices can be used in a wide range of wireless products, such as wireless mice and keyboards, controllers for game consoles, bicycle speedometers, remote controls, garage-door openers, wireless loudspeakers, etc.

The processor on such a device may run software stored on non-volatile memory on the device in order to control the radio communication logic according to a predetermined radio protocol, such as Bluetooth™ or ZigBee™.

A complete product, such as a wireless mouse, is typically assembled by a product manufacturer, who receives a radio-communication chip from a separate radio-chip manufacturer. The chip manufacturer may also provide the product manufacturer with a development kit, containing tools, such as a cross compiler, loader, debugger and documentation, which allow the product manufacturer to develop, install and debug custom a software application for the radio device. The custom application software may, for instance, include routines for receiving input from a movement sensor on a wireless mouse and for transmitting suitable radio messages to an associated USB dongle according to a desired communication protocol.

Rather than requiring the product manufacturer to interface directly with the radio logic on the chip, the chip manufacturer will typically provide a development kit with the chip. The development kit may include source code for a software library or operating system, written by the chip manufacturer, that includes functions for controlling the radio logic, e.g. implementing a particular radio protocol such as Bluetooth Low Energy™. It may also include other functions, such as functions for memory management, processor scheduling, inter-process communication, etc. The application developer can call these supplied functions from its application code, rather than having to write them from scratch. This can make development of the application software simpler and quicker. It can also ease portability between different models of the radio device.

The product manufacturer will typically compile and link the source code from the chip manufacturer with its own custom software application, to create a single binary image file for loading to a predetermined address in the memory of each device.

The applicant has come to realise, however, that such traditional approaches can be improved upon.

From one aspect, the invention provides a method of configuring an integrated-circuit radio communication device, wherein:
- the device comprises memory, radio communication logic, interrupt-interface logic, and a processor having a hardware-interrupt input line;
- the interrupt-interface logic comprises input logic for receiving a signal generated by software executing on the device, and output logic arranged to assert the hardware-interrupt input line of the processor in response to receiving a software-generated signal at the input logic;
- the memory contains a firmware module comprising (i) instructions for controlling the radio communication logic according to a predetermined radio protocol, and (ii) an interrupt routine comprising instructions for receiving an identification of a radio communication function in the firmware module and for invoking the identified radio communication function; and
- the device is configured to invoke the interrupt routine in response to an assertion of the hardware-interrupt input line of the processor, the method comprising loading a software application into the memory of the device, wherein the software application comprises instructions for invoking a radio communication function in the firmware module by (i) generating a signal to the interrupt-interface logic to cause the interrupt-interface logic to assert the hardware-interrupt input line of the processor, and (ii) by identifying the radio communication function to be invoked to the interrupt routine.

Thus it will be seen by those skilled in the art that, in accordance with the invention, a software application can be loaded onto a radio-communication device which invokes radio communication functions from a firmware module through hardware interrupts.

This mechanism removes the need for the software-application developer to link the software-application code with a library or operating system supplied by the device manufacturer. The software application developer does not need to know where the radio communication functions are located in memory, in order to be able to write code that invokes them. This can result in a more stable, simpler and more secure development process.

In preferred embodiments, the firmware module is a pre-linked binary image or module. Preferably, no linking between the firmware module and the software application takes place. It is envisaged that the firmware module will usually be a compiled binary image (e.g. compiled from the C programming language), although it is possible that part or all of it could be assembled directly from machine code.

By removing the need for link-time dependencies between the firmware module and the software application, the chances of bugs arising during development of the software application can be reduced. There is no need to keep re-compiling and re-linking the firmware module during development of the software application. This continuity can avoid bugs occurring and can also aid the debugging process if bugs do arise.

Relatively little information need be provided to the developer of the software application by the device manufacturer. In order to develop the software application, the application developer may be provided with details relating to the mechanism for identifying radio communication functions to be invoked; e.g. a predetermined location in RAM, or an address at which to place a call-back function in the software application, and details of any function identifiers and possible function parameters, as explained in more detail below. The application developer may be provided with a predetermined software memory address, to which the software-application should be loaded. The application developer may also be provided with information relating to the amount of memory (e.g. code space and/or data space) that is available for the software application. At least in some embodiments, this information (in addition to standard details of the processor or device architecture) may be sufficient for an application developer to write, compile and load a software application for the device.

It is envisaged that the application developer could conveniently be provided with a header file or source file (e.g. in the C programming language) which would contain some or all of this information. (Such a header or source file may, of course, optionally contain other, additional features to provide further assistance to the application developer.)

This avoids the need for a device manufacturer to supply any object files, or source code for the radio communication functions, to the software-application developer. This can simplify version control for the device manufacturer, who can change the content and location of functions in the firmware module without having to inform the application developer.

It also means that the device manufacturer need not reveal confidential source code for its firmware module to the application developer.

By providing the integrated-circuit device to a developer of the software application with the firmware module pre-loaded on the device, the security of any confidential information contained in the firmware module can be increased by making it more difficult to access the object code, especially if the device contains memory protection that prevents unauthorised reading of the firmware module.

Because the firmware module need not be linked to the software application, it can be possible to replace one or other of the firmware module and the software application (e.g. with an updated version) even after the device is in the possession of an end user.

From a further aspect, the invention provides an integrated-circuit radio communication device comprising:
 a processor having a hardware-interrupt input line;
 memory;
 radio communication logic; and
 interrupt-interface logic,
wherein:
 the memory contains a firmware module comprising (i) instructions for controlling the radio communication logic according to a predetermined radio protocol, and (ii) an interrupt routine comprising instructions for receiving an identification of a radio communication function in the firmware module and for invoking the identified radio communication function;
 the interrupt-interface logic comprises input logic for receiving a signal generated by software executing on the device, and output logic arranged to assert the hardware-interrupt input line of the processor in response to receiving a software-generated signal at the input logic; and
 the device is configured to invoke the interrupt routine in response to an assertion of the hardware-interrupt input line of the processor.

A software application may be loaded into the memory of such a device and may then invoke radio communication functions by generating a signal to the interrupt-interface logic and by identifying a radio communication function to the interrupt routine.

Thus, in some embodiments, the memory additionally contains a software application comprising instructions for invoking a radio communication function in the firmware module by generating a signal to the interrupt-interface logic to cause the interrupt-interface logic to assert the hardware-interrupt input line of the processor, and by identifying the radio communication function to be invoked to the interrupt routine.

The firmware module may be contained in a region of memory to which read and/or write restrictions apply. The firmware module could be located ROM. More preferably, however, the firmware module is located in a region of non-volatile memory (e.g. EEPROM or flash) which is not readable and/or writable by unprivileged code executing on the device. Read protection can further increase confidentiality protection. Write protection can reduce the risk of accidental or malicious corruption of the firmware module after it has been loaded on the device (e.g. due to bugs in the software application).

It is also, possible, however, that the application developer may be provided with the firmware module as a binary image, and loads both the firmware module and any software application onto the device during the manufacturing process. This can still be more secure for the device manufacturer than providing source code to the application developer. It can also save the application developer from having to compile the firmware module and link it to the software application.

Thus, from a further aspect, the invention provides a method of configuring an integrated-circuit radio communication device, wherein:
 the device comprises memory, radio communication logic, interrupt-interface logic, and a processor having a hardware-interrupt input line;
 the interrupt-interface logic comprises input logic for receiving a signal generated by software executing on the device, and output logic arranged to assert the hardware-interrupt input line of the processor in response to receiving a software-generated signal at the input logic; and
 the device is configured to invoke an interrupt routine in response to an assertion of the hardware-interrupt input line of the processor,
the method comprising:
 loading a firmware module into the memory of the device, wherein the firmware module comprises (i) instructions for controlling the radio communication logic according to a predetermined radio protocol, and (ii) an interrupt routine comprising instructions for receiving an identification of a radio communication function in the firmware module and for invoking the identified radio communication function; and
 loading a software application into the memory of the device, wherein the software application comprises instructions for invoking a radio communication function in the firmware module by generating a signal to the interrupt-interface logic to cause the interrupt-interface logic to assert the hardware-interrupt input line of the processor, and by identifying the radio communication function to be invoked to the interrupt routine.

The firmware module and the software application may be loaded onto the device in any order or substantially simultaneously. It will be appreciated that loading the two simultaneously is still fundamentally different from loading a single, linked software-application-and-library (e.g. as a single binary image file).

The firmware module is preferably loaded to a predetermined firmware memory address. The software application is preferably loaded to a predetermined application memory address.

In all aspects of the invention, the firmware module is preferably a compiled and linked binary image. Similarly, the software application is preferably a compiled and linked binary image. The firmware module and the software application are preferably not linked to each other. The firmware module preferably contains no memory-address data relating to the software application (with the possible exception of the address of one or more call-back functions in the software application, e.g. for passing radio-communication-function parameters to the firmware module, described in more detail below). The software application preferably contains no memory-address data relating to the firmware module. However, in some embodiments it is possible that the software application may contain the addresses of one or more function entry points in the firmware module, e.g. for registering a call-back function, or for passing data as a function parameter; however, even then, the software application preferably does not contain the address of any radio communication function in the firmware module.

Further advantages of embodiments of the present invention arise when the processor supports a plurality of interrupt priorities. Because the radio communication function is invoked via an interrupt, it is then possible for the radio communication function to be executed at a higher priority than the function that causes its invocation.

The processor may take any form, but in some preferred embodiments it is a processor designed by ARM™, and may be from the ARM™ Cortex™-M family (e.g. a Cortex™-M0). The interrupt-interface logic is preferably physically and/or logically separate from the processor. It preferably comprises logic gates that are not used by the processor.

The input logic of the interrupt-interface logic is preferably arranged to detect a signal in response to the processor writing to a predetermined memory address or register, such as a register associated with the interrupt-interface logic, or a predetermined location in RAM. The input logic may be configured to detect a signal when a data bit or other value at a predetermined location changes value. It may be arranged to monitor the location or poll it at intervals in order to detect a change caused by the processor.

The input logic is preferably arranged to detect the signal in such a way that the signal can be generated by one or more standard processor instructions; for instance, instructions from an ARM™ Thumb instruction set (e.g. the ARMv7-M Thumb instruction set). This allows a standard processor core to be used in the devices, without modification, which is highly desirable for minimising extra engineering effort. In some preferred embodiments, software can generate the signal by instructing a processor of the device to write a value to a predetermined memory location (e.g. using a STORE or MOVE instruction). The software application need not contain any system calls or supervisor calls, yet can still invoke radio communication functions at a higher priority level and/or privilege level than the software application executes at.

The device may comprise a plurality of processors; e.g. two or more. In some embodiments, software executing on a first processor may generate a signal to the interrupt-interface logic, while the output logic of the interrupt-interface logic may be arranged to assert the hardware-interrupt input line of a second processor, different from the first processor. In other embodiments, there may be just a single processor.

The interrupt routine may invoke one or more separate functions or subroutines. In some embodiments, such functions or subroutines may be considered to be elements of the interrupt routine, or they may be considered as separate therefrom. In some embodiments the interrupt routine may call or jump to instructions in the software application, e.g. by invoking a call-back function, as described below. The interrupt routine, or a part thereof, may be located at a particular memory address, and this memory address may be stored in an interrupt vector table on the device, such that the processor jumps directly to the interrupt routine in response to an assertion of the hardware-interrupt input line. Alternatively, the interrupt routine may be invoked indirectly, e.g. by an interrupt handler in ROM, or in a boot-loader or other binary module separate from the firmware module.

The software application may use any appropriate mechanism to identify, to the interrupt routine, the radio communication function to be invoked. In some embodiments the software application may identify the radio communication function before it generates a signal to the interrupt-interface logic; in other embodiments it may do so after generating the signal.

Preferably, the software application passes a function identifier to the interrupt routine which identifies the radio communication function to be invoked. The function identifier may take any suitable form; it may, for instance, comprise a binary number, text string, memory address, or other value that uniquely identifies a radio communication function in the firmware module according to a predetermined correspondence or mapping. A plurality of radio communication functions in the firmware module may be associated with different respective function identifiers. The application developer may be provided with an association between radio communication functions and function identifiers (e.g. in written documentation or in a header file) to use when developing the software application.

In one set of embodiments, the software application passes the function identifier to the interrupt routine by writing the function identifier to a shared memory location on the device; for instance, a processor register or other hardware register, or a memory address (e.g. in RAM). The interrupt routine may then read the function identifier from the shared memory location and invoke a radio communication function that is associated with that function identifier. This association may be compiled into the interrupt routine (e.g. as a compiled switch statement), or it may be stored as a data object, such as look-up table, which the interrupt routine can read in order to determine the address of the radio communication function associated with a received function identifier.

Further shared memory locations may enable the software application to pass parameters to the identified radio communication function, either directly or indirectly via the interrupt routine. Thus the software application may comprise instructions for writing one or more parameters to one or more shared memory locations, and the interrupt routine or radio communication function may comprise instructions for reading the one or more parameters from the one or more shared memory locations.

An address for each such shared memory location may be hard-coded into both the firmware module and the software application, or it may be hard-coded into one or other of the firmware module and the software application (e.g. in the firmware module only) and passed to the other via the stack, or by storing it at a different shared memory location. For instance, a single shared memory location hard-coded into both components may be used to transfer a plurality of further shared memory locations by writing the location addresses to the single shared memory location. This can increase flexibility for the device manufacturer by minimising constraints on the memory layout needed to support the software application. Where a memory location is hard-coded into the software application, this may be achieved by providing the application developer with a header file containing the memory location.

In another set of embodiments, the software application passes the function identifier to the interrupt routine on a call stack. The software application may push the function identifier onto the stack and the interrupt routine may read the function identifier off the stack. The interrupt routine may be invokable only by signals generated by the software application (i.e. not from the firmware module or any other software component), which may help to ensure that the state of the call stack on entry to the interrupt routine is predictable; this enables the interrupt routine to know in advance where on the stack to find the function identifier. The software application may also pass parameters for the radio communication function to the interrupt routine by writing them to the stack. The interrupt routine may be arranged to read such parameters from the stack and pass them to the radio communication function. The interrupt routine may rearrange or otherwise process the parameters as necessary. It may push some or all of the parameters back onto the stack before calling the radio communication function.

This set of embodiments is particularly advantageous because it can allow the software application to invoke functions in the firmware module without the need for any RAM or program memory locations to be shared between the software application and the firmware module (although this is not ruled out).

In some embodiments the firmware module may contain the address of a call-back function in the software application. The term "call-back" is used here to describe any function that the firmware module is able to call from the software application, after the software application has passed control to the firmware module through an interrupt; it is not essential that a pointer to the function is passed dynamically to the firmware module. For instance, the address may have been given to the application developer, who may compile and/or link the software application in such a way (e.g. using suitable linker directives) that the call-back function is located at the predetermined address when the software application is loaded onto the device. Alternatively, the software application may pass the address of the call-back function to the firmware module. It may do this by writing the address to a shared memory location or by passing it on the stack, as described above, or the firmware module may contain a call-back-registration function at a predetermined address, to which the software application may pass the address of the call-back function; in this case, the address of the call-back-registration function may be provided to the developer of the software application, e.g. in the form of a stub to be used when linking the software application. Providing the address of one call-back-registration function to the application developer can still be preferable to providing the addresses of all of the radio communication functions, because it still allows the firmware developer freedom to relocate radio communication functions within the firmware module at a later date.

The interrupt routine may be configured to call a function in the software application (e.g. such a call-back function), which may provide a function identifier and/or radio-communication-function parameters to the interrupt routine This may be accomplished by the interrupt routine's passing one or more memory addresses (e.g. pointers) to the call-back function, and by the call-back function writing a function identifier and/or parameters to the memory addresses. The interrupt routine can then access the data at the addresses to determine the function identifier and/or parameters. It may push some or all of the parameters back onto the stack before calling the radio communication function. Using a call-back to fetch parameters can allow regular "C" language parameter formatting in a function prototype, instead of having to parse a memory location into types using a packed structure. This approach may therefore making coding easier, compared with passing parameters in a predetermined shared memory location or on the stack.

It will be appreciated that how the concepts of calling a function and returning from a function are implement will depend on the architecture of the processor. In some embodiments, the processor may support specific call and/or return instructions, while in other embodiments different control-flow and/or stack operations may be used to implement these higher-level concepts.

In preferred embodiments of any of the above aspects, the firmware module is arranged so that all the radio communication functions provided by the firmware module to the software application can be invoked by generating a signal to the interrupt-interface logic. In this way, no other mechanism for invoking firmware radio functions need be supported by the firmware module or the device, thereby avoiding substantial static or run-time link dependencies, and simplifying the device and the development of the software application.

It will be appreciated that the firmware module may provide other functions, not necessarily related to radio communication, which the software application can invoke; for example, an encryption algorithm. Preferably the device is configured so that the invoking of all such functions by the software application is carried out by generating a signal to the interrupt-interface logic.

Because embodiments of the device need not contain a traditional, full operating system, the application developer can be free to develop the software application as a native application for the processor architecture, without having to learn how to interface with a proprietary operating system supplied by the device manufacturer. This is a particularly attractive feature for the application developer, especially when the processor is well-known in the art.

If the device has a hardware abstraction layer in addition to the firmware module, the software application may interface directly with this layer. Application-specific drivers may also be loaded onto the device.

Configuring the device may comprise using a correspondence between radio-communication-function identifiers and radio communication functions when compiling the software application. Compiling or loading the software application may make use of the predetermined software-application memory address. In some embodiments, configuring the device may comprise receiving the correspondence between supervisor call numbers and radio communication functions and/or receiving the predetermined software-application memory address, e.g. as a header file. Such information may then be used when compiling the software application.

The processor preferably supports a plurality of interrupt priorities. In some embodiments, some functions in the firmware module are assigned a relatively high priority, while others are assigned a relatively low priority. Preferably, functions associated with time-critical radio communication operations are assigned the relatively high priority.

In preferred embodiments, the software application comprises a vector table that allows the firmware module to invoke functions within the software application without knowing in advance where they are located. The firmware module is preferably configured to invoke a function in the software application in response to the firmware module's receiving an interrupt. Such an interrupt may arise, for example, from a peripheral, such as a movement sensor. The firmware module may be configured to invoke a function in the software application in response to the device receiving a radio data packet.

The software application is preferably arranged to handle interrupts forwarded by the firmware module, as explained in more detail below.

The software application may execute some event-driven functions at a relatively high priority and execute certain other functions at a relatively low priority. The priority levels used by the software application are preferably interleaved with the priority levels used by the firmware module. The highest firmware priority level is preferably higher than the highest software-application priority level, so that critical radio communication operations, implemented in the firmware module, can always take precedence over the software application. This can provide protection against careless programming in the software application.

The firmware module and the software application may each have a respective interrupt vector table. The two tables preferably use the same interrupt-vector-address offsets as each other. The offsets of interrupt vector addresses in the firmware module's vector table (and hence the software application's vector table, when the two use the same offsets) are typically fixed by the processor architecture. The device is preferably configured to use the firmware module's vector table when processing an interrupt (i.e. as the system interrupt vector table).

However, the firmware module is preferably configured so that all interrupts that the firmware module is not programmed to handle itself are passed on to the software application. This may be implemented in the firmware module by causing execution to branch to the address contained in the corresponding offset in the software application's vector table whenever the firmware module is not configured to handle a particular interrupt. This is possible when the software application is loaded to a predetermined memory address, as this allows the firmware module to know, in advance, where to find the software application's vector table, once the software application has been loaded onto the device.

For example, in some embodiments the RESET interrupt handler address is always placed at offset=0 by the compiler. Therefore, the RESET handler address in the firmware module's vector table will be at address 0x0000 0000+ 0=0x0000 0000 in the memory. The RESET handler address in the software application's vector table is at address CLENR0+0=CLENR0, where CLENR0 is the base memory address at which the software application is located.

This interrupt forwarding mechanism conveniently allows the software application to be programmed to handle hardware interrupts in substantially the same way as if no firmware module were present on the device. The firmware module can be invisible to the developer of the software application, and its compiling, for the purposes of receiving interrupts. The interrupt forwarding is preferably implemented in such a way that it adds latency of fewer than about 30 instructions or less than about 3 microseconds, compared with a direct hardware interrupt.

In some embodiments, the firmware module comprises a mechanism for substantially disabling the firmware module. Such disabling may be carried out via a call to the firmware module (preferably using the interrupt-interface logic mechanism). Disabling the firmware module may cause the firmware module to reset the protocol stack and to disable any memory protection (if present) in order to give resources back to the software application. When disabled, the firmware module preferably forwards all interrupts to the software application (even those which it might otherwise have handled itself).

The processor preferably supports seamless transitions from one interrupt priority level to another. This is sometimes referred to as tail-chaining. This provides an elegant means of transferring control between the software application and the firmware module (and vice versa) so as to allow time-critical radio communication functions to take precedence when necessary.

The device preferably comprises memory protection logic arranged to intercept memory access instructions. This logic may be located between the processor and the memory. It may use the location of a memory-access instruction (i.e. where the processor has read the instruction from) to determine whether to allow access. The memory protection logic is preferably configured to prevent the software application from reading and/or overwriting the firmware module.

Such memory protection can provide benefits in protecting sensitive information in the firmware module from being read by the developer of the software application. It can also minimise potential damage from programming errors in the software application, as well as aiding the detection and correction of bugs in the software application. The memory protection logic may be configured to protect RAM associated with the firmware module from being read and/or written to by the software application.

The processor, memory, and radio communication logic are preferably integrated on a single semiconductor layer; e.g. a silicon chip. However, they may alternatively be integrated in a multi-layer module.

The memory is preferably a non-volatile memory such as EEPROM or flash. It preferably supports random-access reading, so that the firmware module and software application can be executed directly from the memory.

The skilled person will appreciate that the device will typically also comprise volatile memory, such as RAM. It may additionally comprise one or more peripherals. It may have connections for receiving power and a clock signal. It may have a connection for an antenna. It may have one or more input and/or output interfaces such as a serial connection.

Optional or preferred features of one aspect or embodiment described herein may, wherever appropriate, be applied to any other aspect or embodiment.

Certain preferred embodiments of the invention will now be described, by way of example only, with reference to the accompanying drawings, in which:

FIG. 11 is a figurative diagram showing yet another alternative mechanism for invoking a communication function.

Figure 1:
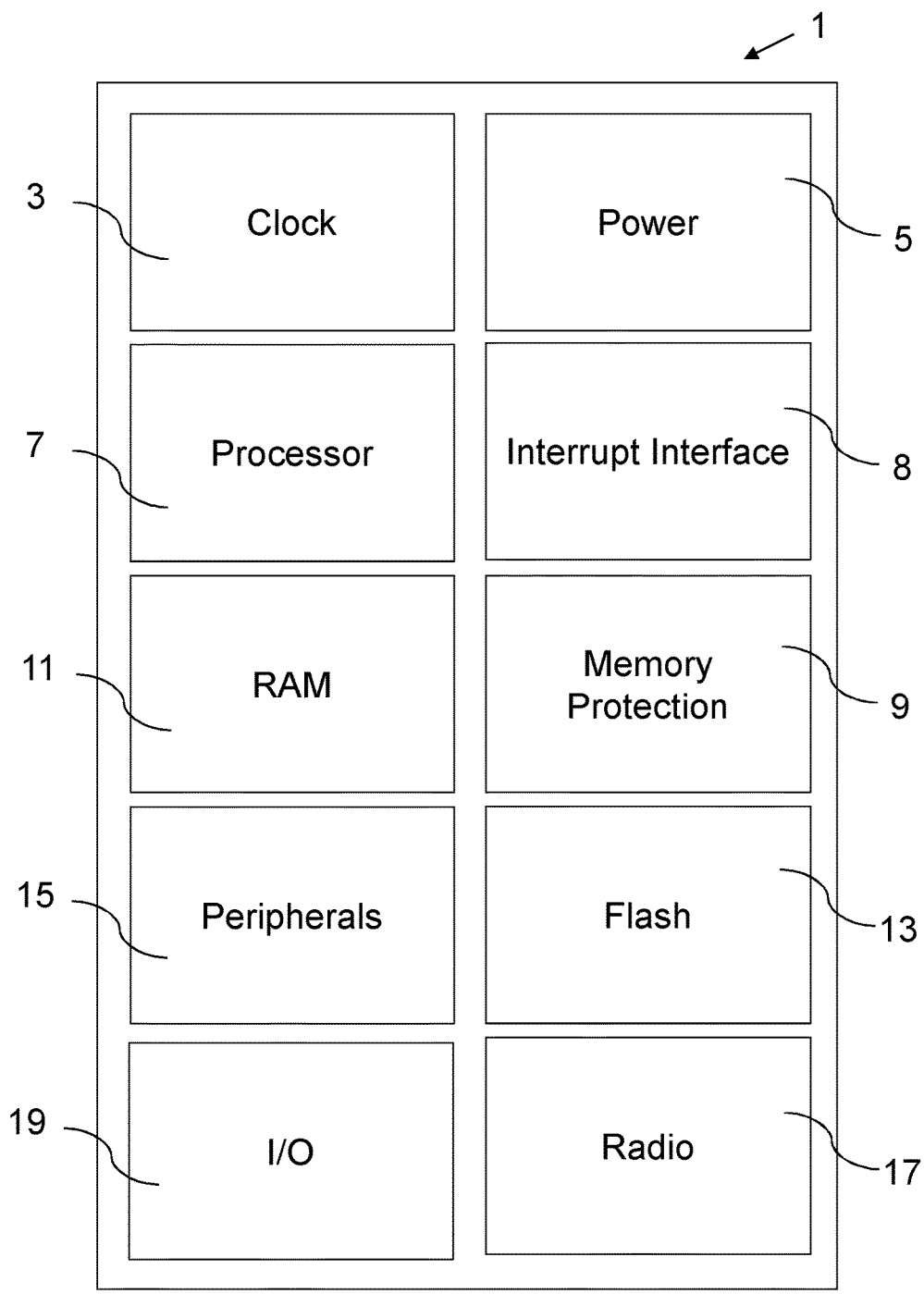
FIG. 1 is a schematic drawing of a microcontroller embodying the invention.

FIG. 1 shows an integrated-circuit microcontroller 1, sometimes known as a radio-on-a-chip. It comprises clock logic 3, which may include a resistor-capacitor oscillator and/or may receive an input from an off-chip crystal oscillator (not shown), power management circuitry 5, a processor 7 (e.g. an ARM™ Cortex™-M0), interrupt-interface logic 8, memory protection logic 9, RAM 11, non-volatile flash memory 13, one or more peripherals 15, radio communication logic 17 and input/output circuitry 19.

The processor 7, RAM 11 and flash memory 13 are interconnected in a conventional manner, e.g. using lines and buses (not shown). The memory protection logic 9 is situated so as to intercept instructions from the processor 7 to the RAM 11 and flash memory 13. The interrupt-interface logic 8 is connected to a spare hardware interrupt input of the processor 7 and to a memory bus. When installed in a product, the microcontroller 1 may be connected to a number of external components such as a power supply, radio antenna, crystal oscillator, capacitors, sensors, audio/visual output devices, etc. (not shown).

Figure 2:
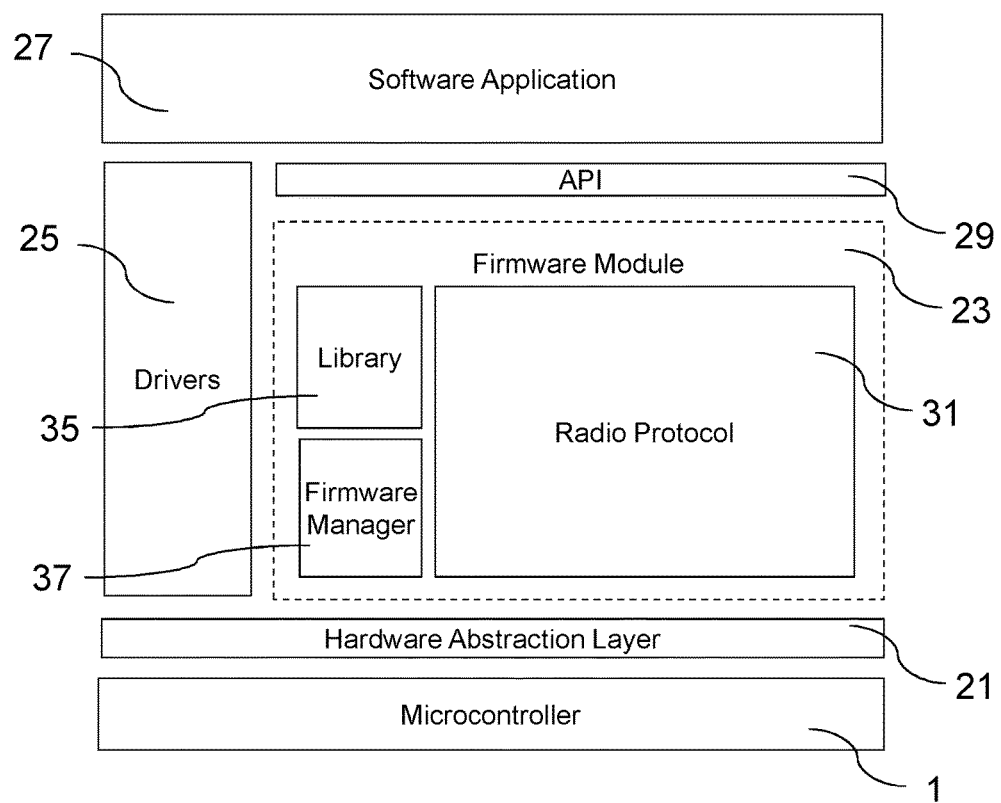
FIG. 2 is a schematic drawing showing major software components within the microcontroller architecture.

FIG. 2 shows the major components of the software architecture. These include an optional hardware abstraction layer 21, such as the ARM™ Cortex™ Microcontroller Software Interface Standard, a firmware module 23, drivers 25 and a software application 27. The drivers 25 may be dedicated to the software application 27.

The firmware module 23 is a linked binary application comprising a number of embedded software blocks. A radio protocol block 31 implements one or more wireless protocol stacks, such as Bluetooth Low Energy™. A library 35 provides shared hardware resource management and functions such as random number generation, configuring interrupts and priority, power management (e.g. for enabling and disabling peripherals), encryption functions, etc. A firmware manager 37 supports enabling and disabling the firmware module, and enabling and disabling the wireless protocol stack.

The firmware module 23 owns the system vector table and is the entry point after all resets.

An application programming interface (API) 29 for the firmware module 23 allows the software application 27 to invoke functions in the firmware module 23. It is implemented entirely using signals to the interrupt interface logic 8. Each firmware function is associated with a unique function number. This mapping can be provided to the developer of the software application 27 to allow the functions to be called correctly. Its contents may be incorporated into both the firmware module 23 and the software application 27 when each is compiled. A predetermined shared address in the RAM 11 is writable by the software application 27 and readable by the firmware module 23. Use of this address allows the software application 27 to pass a function number to the firmware module 23.

The firmware module 23 can communicate events to the software application 27 using software interrupts, the content of which is buffered until read (polled) by the software application 27. The reading is done through an API call (e.g. event_get( )).

The software application 27 can access the microcontroller 1 hardware directly, or via a hardware abstraction layer 21, e.g. by means of application-specific drivers 25, in addition to being able to use the firmware module 23 to use the hardware indirectly.

Figure 3:
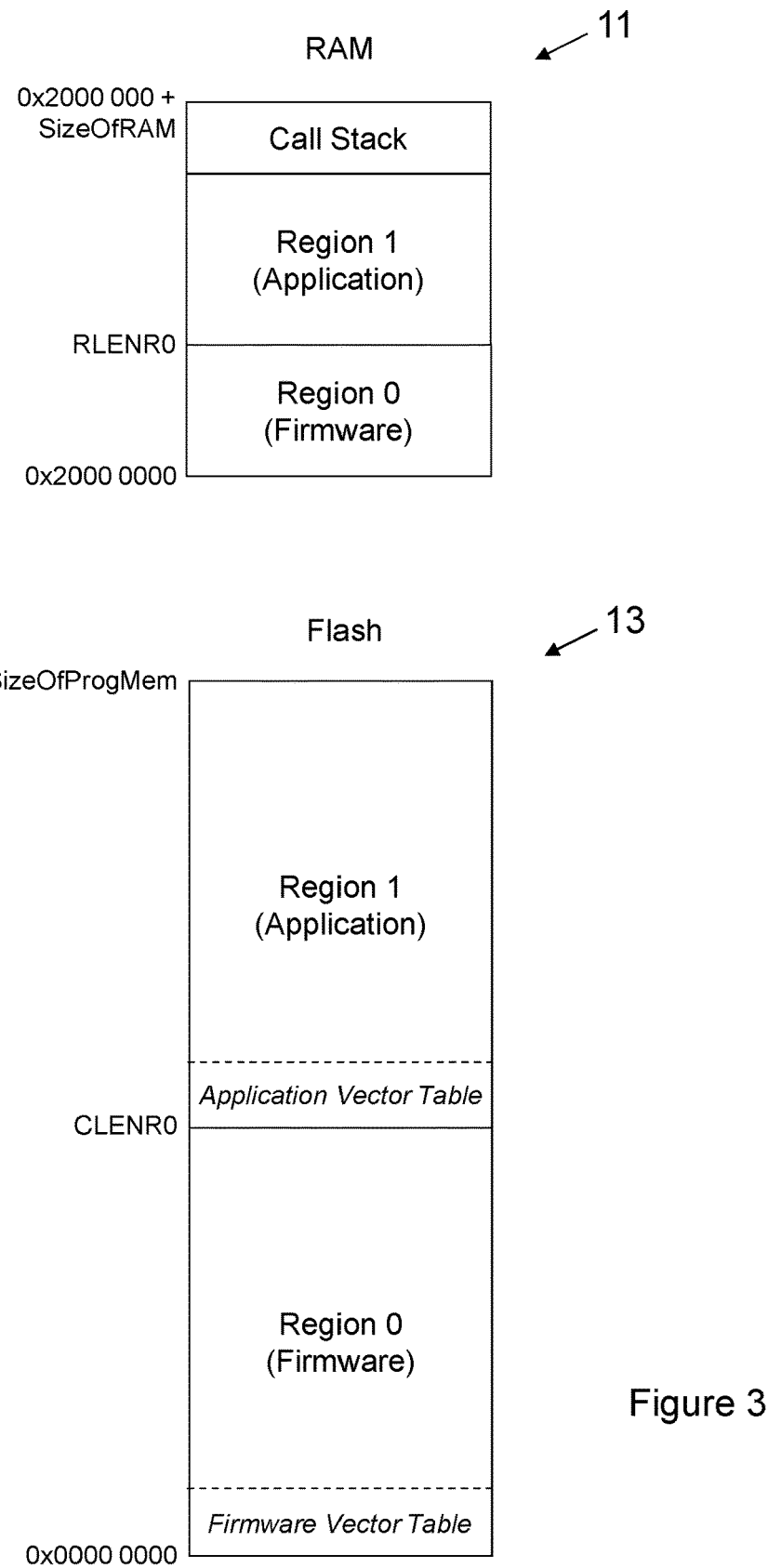
FIG. 3 is a schematic memory map for the microcontroller.

FIG. 3 shows how the RAM 11 and flash 13 are shared between the firmware module 23 and the software application 27 (including any application-specific drivers 25). When using an ARM™ Cortex™-M0 processor 7, the flash 13 is assigned addresses from zero (0x0000 0000) upwards, to its capacity, SizeOfProgMem and the RAM 11 is assigned addresses from 0x2000 0000 upwards to (0x2000 0000+ SizeOfRAM). Different address values may of course be used in other embodiments.

The flash 13 comprises two distinct regions either side of address CLENR0 (code length region 0). Region 0, between zero and CLENR0, is where the firmware module 23 is loaded. Its interrupt vector table is stored at address zero. Region 1, extending upwards from CLENR0, is where the software application 27 is loaded. It too has an interrupt vector table, at address CLENR0, the purpose of which is explained below. It will be appreciated that the device 1 may have other non-volatile memory (not shown) which may be used for other purposes, such as storing configuration information or flags.

The RAM 11 similarly has a Region 0, from the base address 0x2000 000 to RLENR0, and a Region 1, extended upwards from RLENR0. RAM Region 0 provides data storage for the firmware module 23 while RAM Region 1 provides data storage for the software application 27. A call stack is shared between the firmware module 23 and the software application 27 and grows downwards, e.g. from 0x2000 0000+SizeOfRAM. The memory allocated to the call stack must be big enough for the needs of both the software application 27 and the firmware module 23. The predetermined shared memory address may be in Region 1 of the RAM 11, or may be located elsewhere in the RAM 11, outside Regions 0 and 1.

The firmware module 23 call-stack usage requirement may be published for the device 1 by the device manufacturer. The developer of the software application 27 must then define an initial stack pointer and reserve sufficient stack memory for both the firmware module 23 and his software application 27. The firmware module 23 will initialize the main stack pointer on reset.

The memory protection logic 9 is arranged to intercept all memory access requests (e.g. read requests) from the processor 7 to the flash 13 and the RAM 11. It determines the source of the access request instruction (e.g. whether the request is from the firmware module 23 or from the software application 27). It also accesses memory protection configuration data (e.g. stored in one or more dedicated registers) which specifies respective access permissions for the various sources, and allows or denies the access request accordingly.

In some preferred embodiments of the invention, the software application 27 is denied read and/or write access to flash Region 0 and to RAM Region 0. This protects confidentiality for the firmware module 23 and can prevent inadvertent or malicious writing by the software application 27 to memory locations allocated to the firmware module 23, thereby increasing robustness and security. The software application flash Region 1 may also be protected from read access, e.g. to protect against read back via an external debugging interface.

This means that the initial stack pointer cannot be in RAM Region 0 as the software application 27 does not have write access to this region. In other embodiments of the invention, the call stack may be in two parts, where the firmware module 23 call stack is located in RAM Region 0 and the software application 27 call stack is located in RAM Region 1.

The interrupt-interface logic 8 contains a single-bit register (not shown) which is addressable by the processor 7. It is arranged so that, on detecting a change in the register (e.g. a toggling of value, or a change to a predetermined value), the logic 8 asserts the hardware interrupt line to the processor 7.

Figure 4:
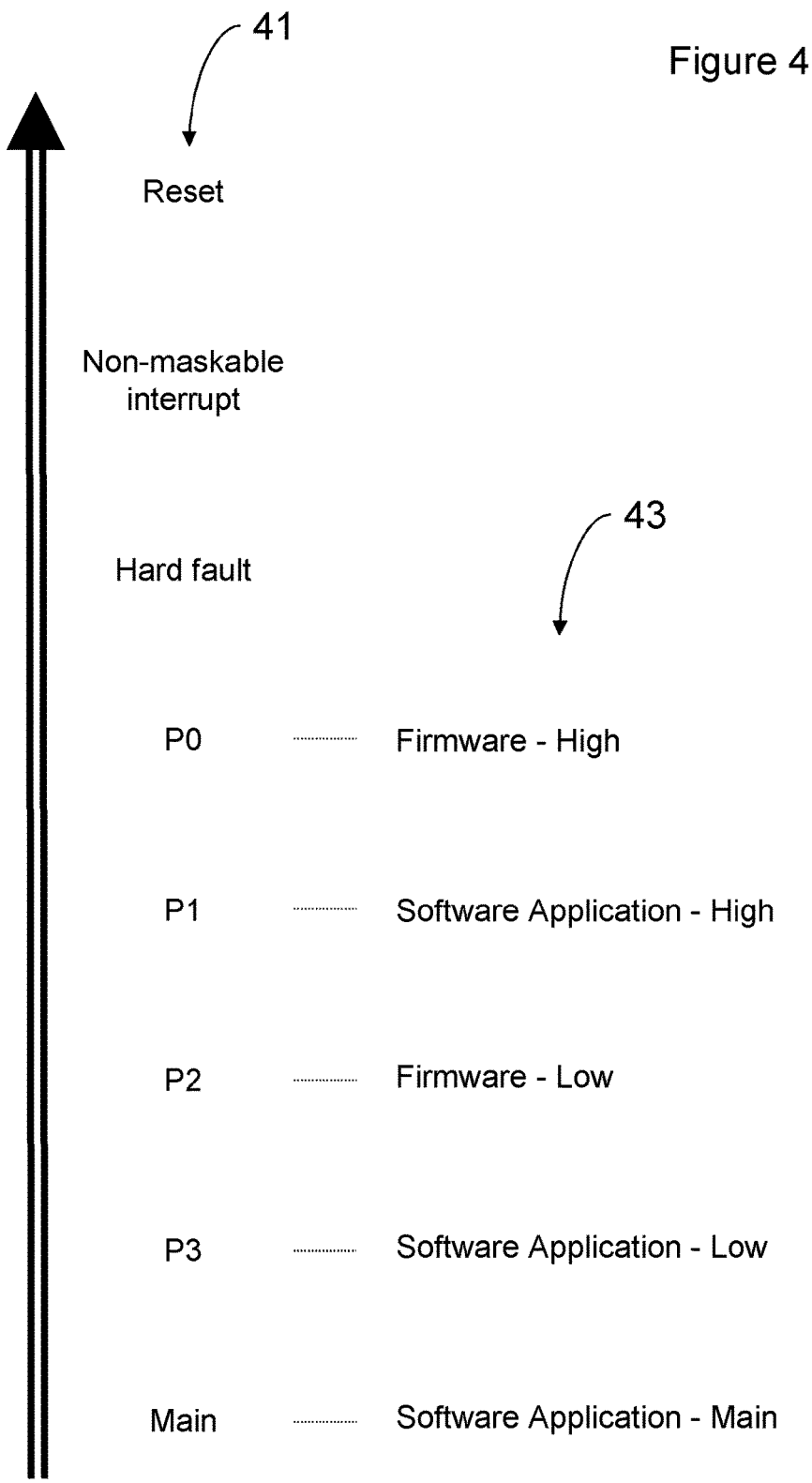
FIG. 4 is a figurative diagram of different processor interrupt priority levels.

FIG. 4 shows the different interrupt levels 41 provided by an ARM™ Cortex™-M0 processor, with increasing priority in the direction of the arrow, and how these levels are mapped to the interrupt levels 43 used by the firmware module 23 and software application 27.

Above the Main background context of the software application 27 are four interrupt priorities which are used as follows, in increasing order of priority: software application low priority, firmware module low priority, software application high priority and firmware module high priority. The high-priority software application interrupt is used for critical interrupts where low latency is required.

Figure 5A:
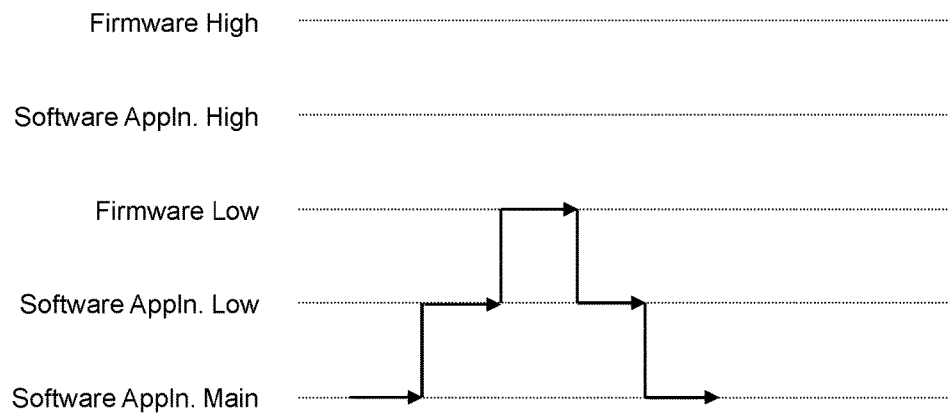
FIGS. 5a-5c are figurative diagrams illustrating various interrupt scenarios.
Figure 5B:
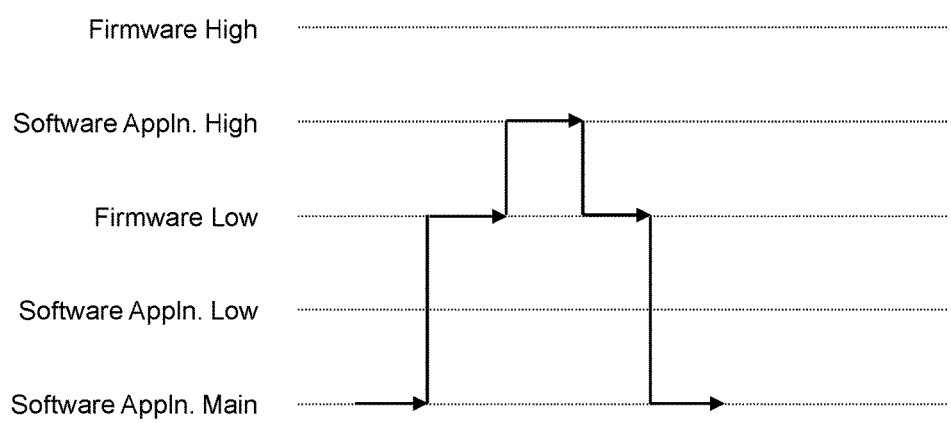
Figure 5C:
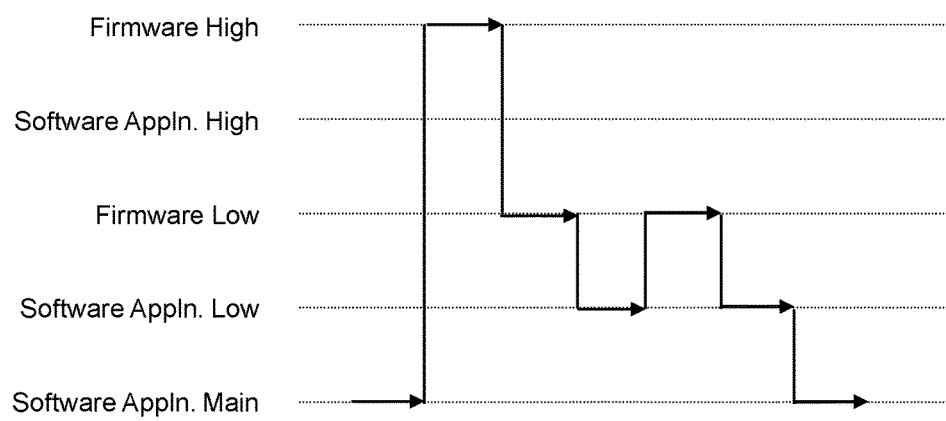

FIGS. 5a-5c show various examples of possible changes in priority level.

FIG. 5a illustrates a background main process in the software application 27 being interrupted by the software application at low priority, e.g. by a serial driver.

The software application 27 then invokes a function in the firmware module 23 by writing the function number associated with the function to the predetermined shared memory address, and then writing an addressable single-bit register in the interrupt interface logic 8 so as to cause the interrupt interface logic 8 to signal a hardware interrupt to the processor 7. A interrupt handler in the firmware module 23 responds to the interrupt at the low-priority firmware level (which is the chosen default level for this particular interrupt handler) by reading the function number from the predetermined shared memory address and calling (still at the low-priority firmware level) the indicated function. Once this has completed, execution returns to the application low-priority level and control is returned to the software application 27. Finally, the software application 27 completes its operation and execution returns to the main background level.

FIG. 5b illustrates an API call to the firmware module 23 being made from the main context of the software application 27 This may be done using by the software application 27 signalling the interrupt interface logic 8 to trigger an interrupt. In this example, the execution of the API function in firmware low-priority is then interrupted by a high-priority software-application exception. This may be to service a sensor input, for example. It may involve the firmware module 23 forwarding an interrupt from the sensor input to the software application 27. Once the software application 27 finishes its high-priority execution, the firmware API call can continue at the lower priority firmware level, before finally returning to the background main process.

FIG. 5c illustrates a high-priority interrupt of a background main process in the software application 27 by the firmware module 23. This could be due to a time-critical radio communication interrupt, such as an incoming radio packet, to which the device 1 must respond. The interrupt service routine in the firmware module 23 may signal the interrupt interface logic 8 to trigger a low-priority firmware interrupt (by writing a function number to the predetermined shared memory address, and writing an addressable single-bit register in the interrupt interface logic 8), to signal to the higher levels of the radio protocol stack that a certain function is required. On completion of the high-priority routine, the low-priority routine is executed immediately, due to the tail-chaining capabilities of the processor 7 (i.e. without having to revert to the background main level in between). The low-priority firmware routine in turn triggers an interrupt to signal to the software application 27 that a radio data packet has been received (through interrupt forwarding). This interrupt is chained after completion of the low-priority firmware module routine. In this example, the software application 27 then makes an API call to the firmware module 23 by signalling the interrupt interface logic 8, as in FIG. 5a. Finally, the software application low-priority operation completes and execution returns to the main level.

Figure 6:
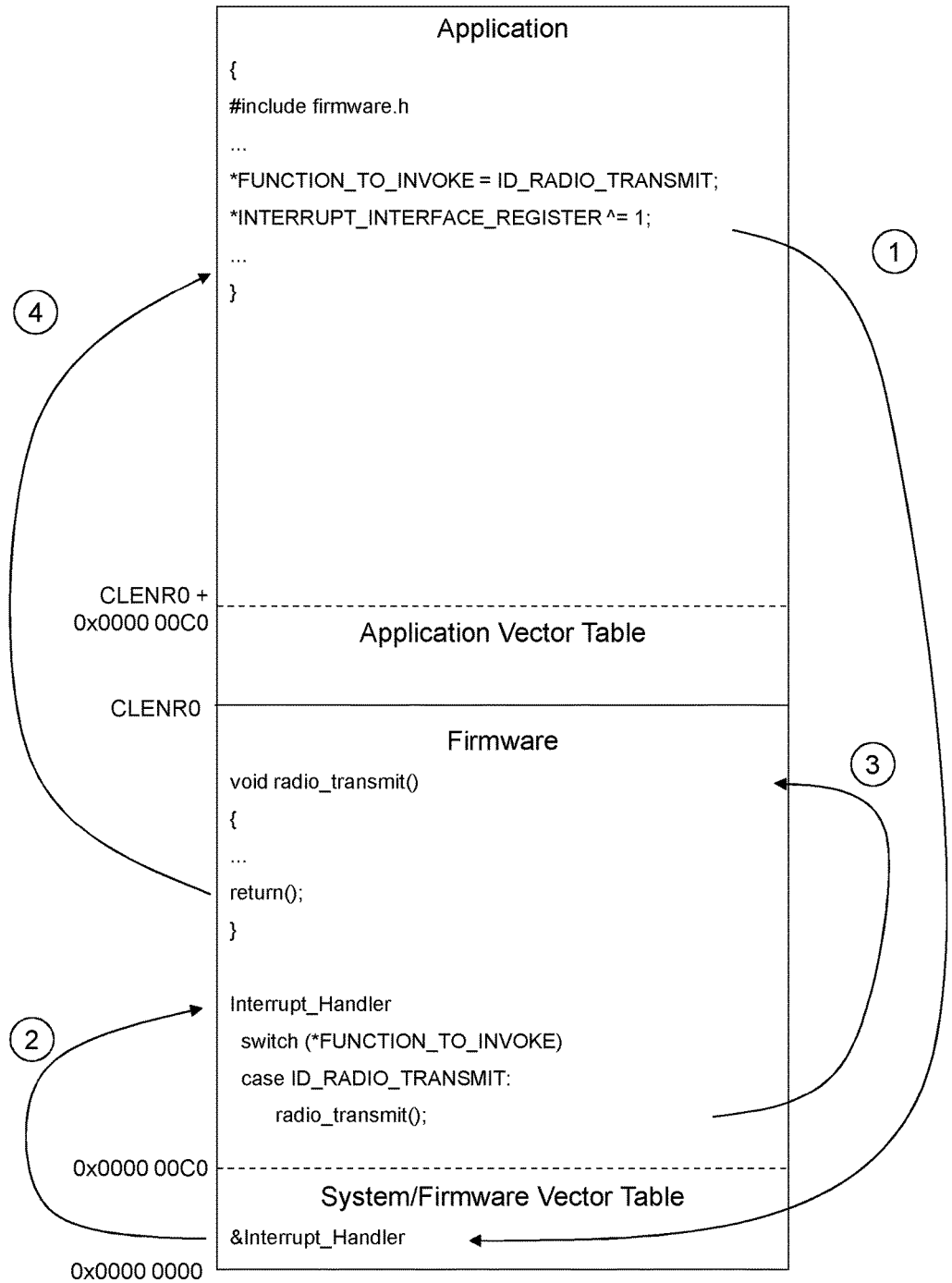
FIG. 6 is a figurative diagram of source code elements illustrating the software application calling a function in the firmware module.
Figure 7:
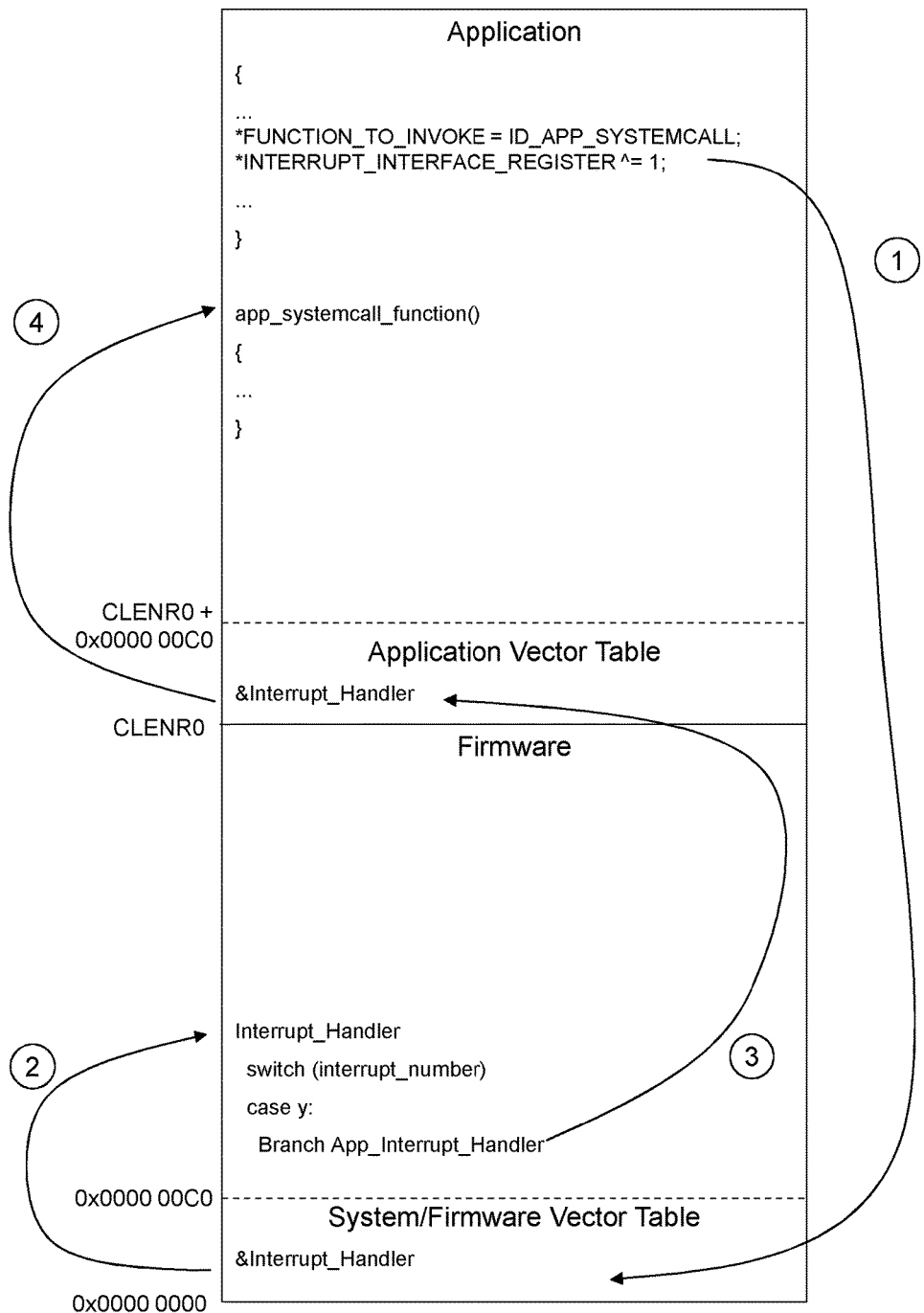
FIG. 7 is a figurative diagram of source code elements illustrating the software application using a system call to invoke an internal function.
Figure 8:
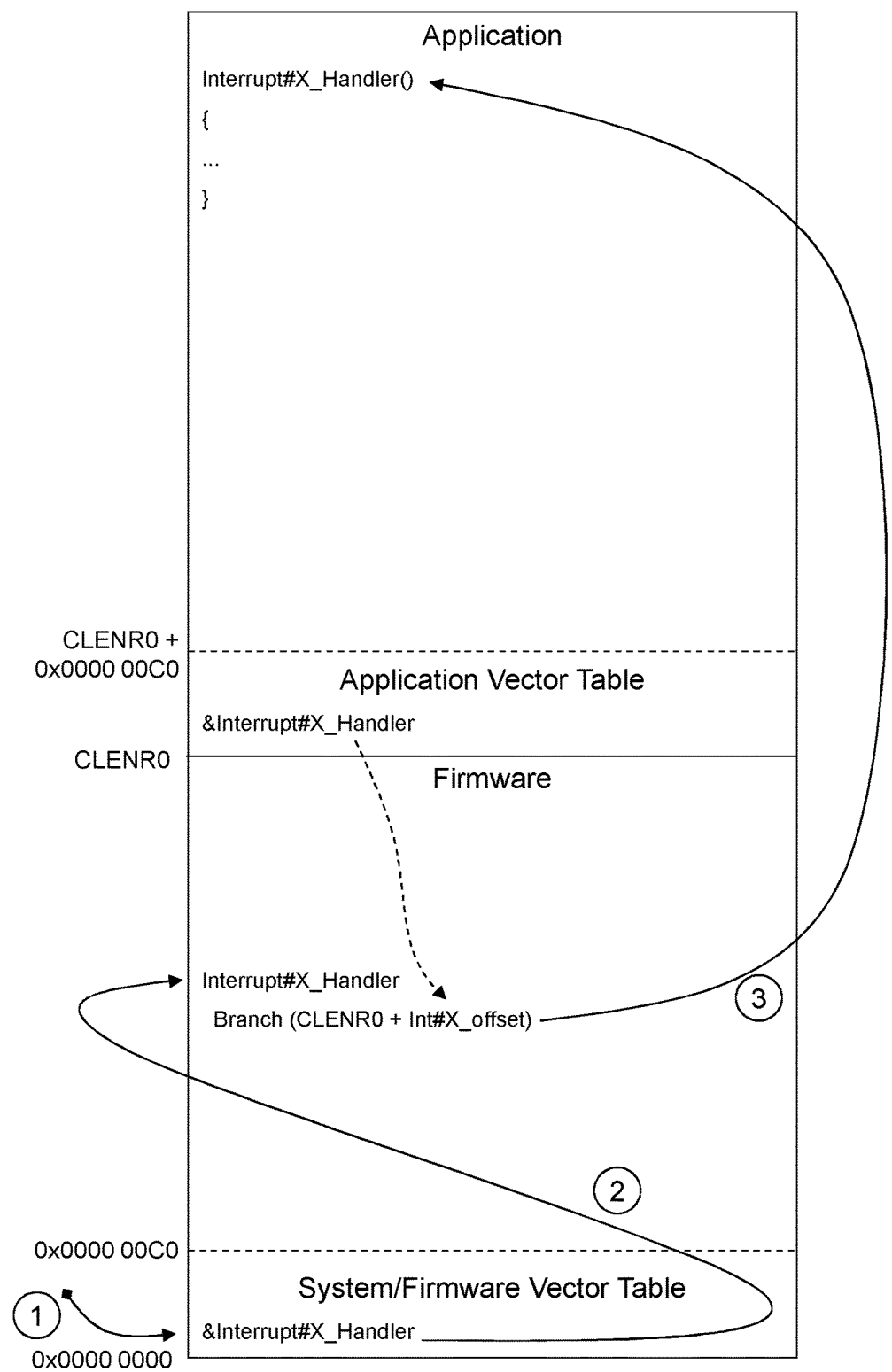
FIG. 8 is a figurative diagram of source code elements illustrating the software application receiving a hardware interrupt.

FIGS. 6-8 illustrate different ways in which control may pass between the software application 27 and the firmware module 23. C-like pseudo-code extracts are used for illustration. In practice, machine code instructions are executed by the processor 7 from the flash memory 13. The numbered arrows in the figures indicate successive execution steps.

FIG. 6 shows the software application 27 calling a function "radio_transmit" through the API 29 of the firmware module 23. The application 27 first writes a unique function identifier for the radio_transmit function (ID_RADIO_TRANSMIT) to a shared memory location (FUNCTION_TO_INVOKE) in RAM 11. The identifier and address of the shared memory location are imported using a firmware header file supplied to the developed of the software application 27 by the device manufacturer. Next, the application 27 toggles a binary flag in a register in the interrupt interface logic 8 by writing to the address INTERRUPT_INTERFACE_REGISTER (also defined in the header file).

The interrupt interface logic 8 asserts a hardware interrupt and the processor 7 invokes the relevant interrupt handler via the firmware module's interrupt vector table (which acts as the system interrupt vector table). The interrupt handler reads the identifier associated with the function called by the software application 27 from the shared memory location. It may also receive arguments or parameters from the software application 27 using further shared memory locations, in a similar way. Alternatively, such arguments may be passed via hardware memory registers or via the call stack.

The interrupt handler calls the radio_transmit firmware function. Other firmware functions can be invoked instead, such as other radio control functions (e.g. an instruction to transmit data by radio), firmware management functions (e.g. to disable the firmware module), or library functions (e.g. to generate a random number). Once the function executes, the interrupt is ended and control returns to the software application 27. A return value may be available to the software application 27 in a register or on the call stack.

FIG. 7 shows the software application 27 invoking one of its own functions via a hardware interrupt. It might do this in order to change from a low priority to a high priority execution level. Similarly to the situation in FIG. 6, the software application 27 uses the interrupt interface logic 8 to trigger a hardware interrupt, and to cause execution to pass to an interrupt handler in the firmware module 27. However, in this case, the instruction passes a function identifier in a range that is reserved for the software application's own use. The firmware module 23 thus causes execution to branch to a handler function (app_systemcall_function( )) in the software application 27, potentially at a different priority level to that of the preceding operation.

FIG. 8 shows how a different hardware interrupt (e.g. from the radio logic 17, or a peripheral 15) can be received by the software application 27. On receiving the interrupt, an interrupt handler in the firmware module 23 is vectored to. This checks whether the firmware module 23 is enabled and whether it is an interrupt that the firmware module 23 is arranged to handle. If so, the firmware module 23 handles the interrupt. If not, as shown here, the firmware module 23 passes control to an interrupt handler routine in the software application 27. The firmware module 23 knows where to find this routine because the location of the software application vector table (at CLENR0) is predetermined, and the offsets into this vector table are the same as the offsets into the firmware module's vector table.

The firmware module 23 is arranged to forward interrupts to the software application 27 by default, unless they are interrupts that the firmware module 23 is configured to handle. Additionally, if the firmware module 23 has been disabled by the software application 27 (e.g. via a suitable API call to the firmware manager 37), then the firmware module will forward all interrupts to the software application 27.

Figure 9:
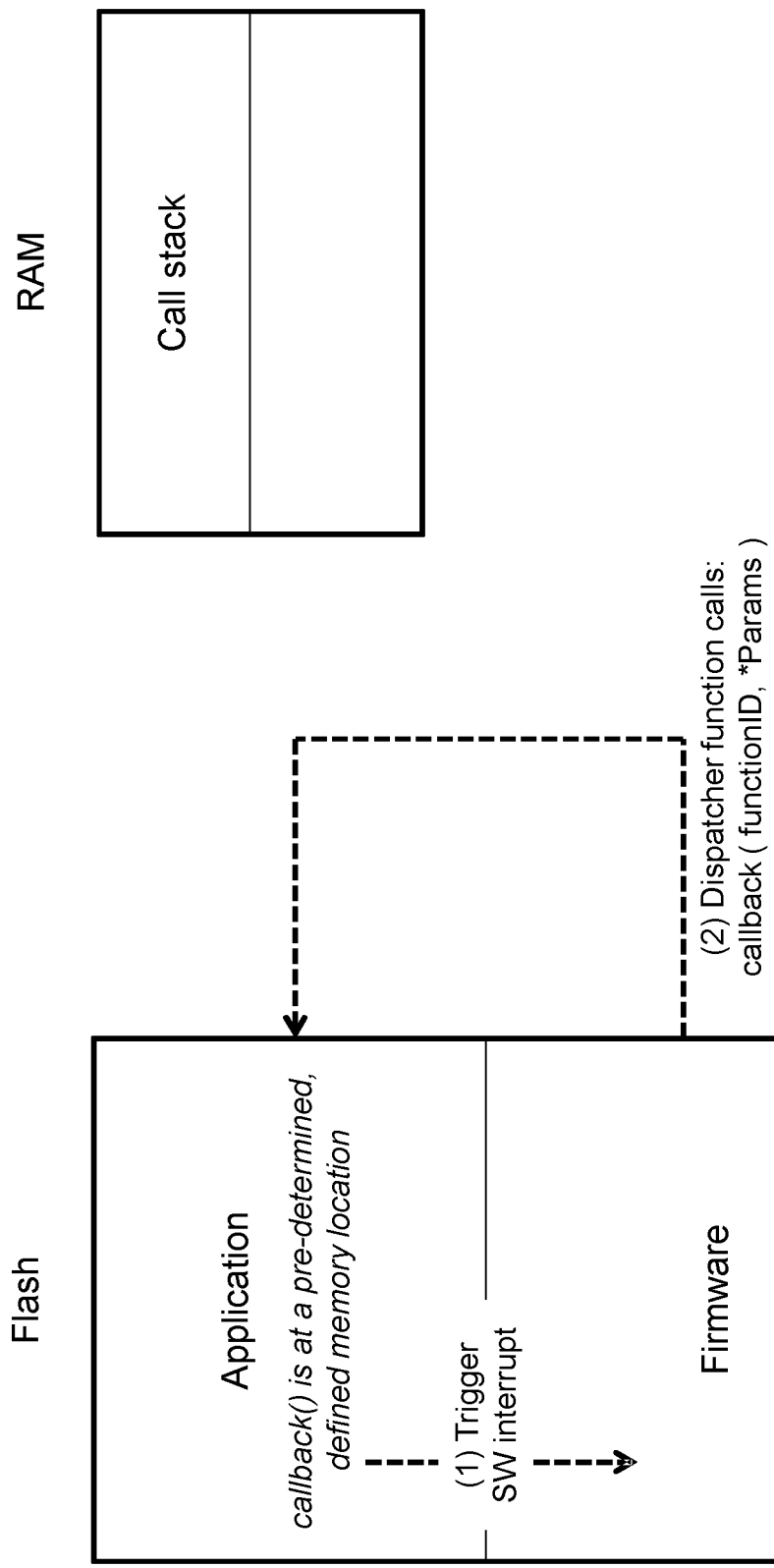
FIG. 9 is a figurative diagram showing an alternative mechanism for invoking a communication function.

FIG. 9 shows an alternative mechanism for invoking a radio communication function which does not require the use of a shared memory location in RAM. Some embodiments may use this mechanism instead, or as well as, the mechanism described with reference to FIG. 6. The software application 27 contains a call-back function located at a predetermined address in the flash memory 13. The firmware module 23 can branch to this call-back function because the predetermined address is known when the firmware module is compiled and linked.

To invoke a radio communication function in the firmware module, the software application first triggers an interrupt by writing an addressable single-bit register in the interrupt interface logic 8. The interrupt handler in the firmware module 23 then calls the call-back function in the software application 27, and passes a pointer to a functionID variable and a pointer to a parameter data block or data structure. The call-back function then writes the identifier of the desired radio communication function to the memory address pointed to by the functionID pointer, and writes any parameters at the address pointed to by the Params pointer. Control then returns to the interrupt handler in the firmware module 23, which uses the function identifier to determine what radio communication function in the firmware module 23 to invoke. It parses the parameters as necessary (e.g. by moving them from the Params memory address to the stack), and invokes the radio communication function.

Figure 10:
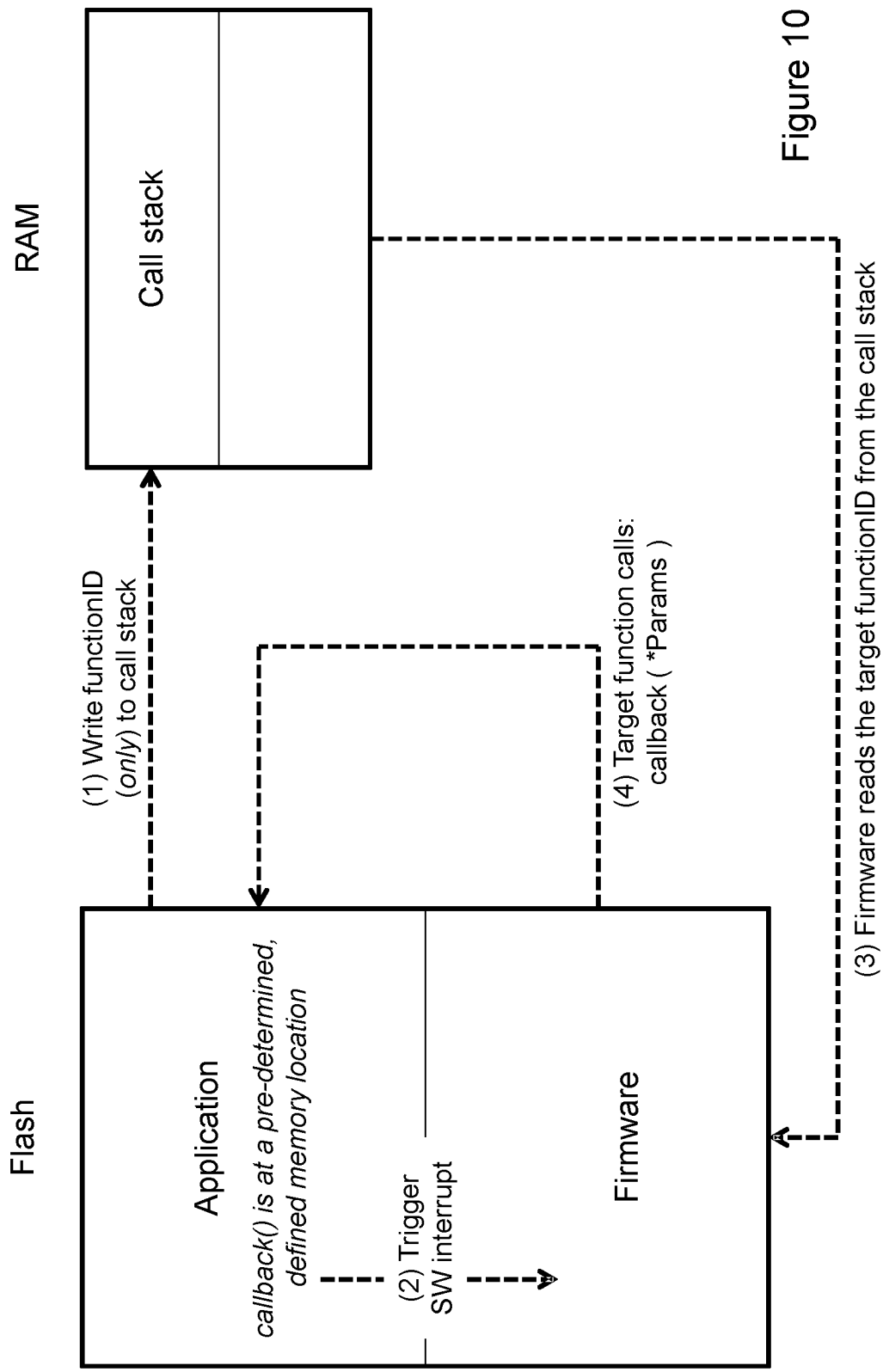
FIG. 10 is a figurative diagram showing another alternative mechanism for invoking a communication function.

FIG. 10 shows a further alternative mechanism, which some embodiments may use as well as, or instead of, other mechanisms described herein. This is similar to FIG. 9, except that the function identifier is not passed using a pointer, but is instead pushed to the call stack by the software application 27.

In this example, the software application 27 first writes an identifier of a desired radio communication function to the stack, and then triggers an interrupt by writing an addressable single-bit register in the interrupt interface logic 8. The interrupt handler in the firmware module 23 reads the function identifier off the call stack. It then calls a call-back function in the software application 27, to which it passes a pointer to a parameter data block. The call-back function writes any radio-communication-function parameters to the address pointed to by the pointer. The interrupt handler then invokes the radio communication function, with the indicated parameters.

FIG. 11 shows a further alternative mechanism, which some embodiments may use as well as, or instead of, other mechanisms described herein. In this mechanism, there is no requirement for a shared RAM location, nor for any call-back functions. Embodiments using this mechanism may be preferred, since they can potentially dispense with any sharing of memory locations (RAM or flash) between the developers of the firmware module and the software application (apart from possibly the base address at which the software application is to be loaded).

The software application 27 pushes onto the call stack an identifier of a desired radio communication function and any parameters that are to be sent to the radio communication function. It then triggers an interrupt by writing an addressable single-bit register in the interrupt interface logic 8. The interrupt handler in the firmware module 23 then reads the identifier and the parameters from the stack. It processes the parameters as necessary (e.g. rearranging them if necessary, and pushing them back onto the call stack) and calls the radio communication function identified by the identifier.

In all these various ways, an integrated radio communication device can be configured and used securely and conveniently.

The invention claimed is:

1. A method of configuring an integrated-circuit radio communication device, wherein:
   the device comprises memory, radio communication logic, interrupt-interface logic, and a processor having a hardware-interrupt input line;
   the interrupt-interface logic comprises input logic for receiving a signal generated by software executing on the device, and output logic arranged to assert the hardware-interrupt input line of the processor in response to receiving a software-generated signal at the input logic;
   the memory contains a firmware module comprising (i) instructions for controlling the radio communication logic according to a predetermined radio protocol, and (ii) an interrupt routine comprising instructions for receiving an identification of a radio communication function in the firmware module and for invoking the identified radio communication function; and
   the device is configured to invoke the interrupt routine in response to an assertion of the hardware-interrupt input line of the processor,
   the method comprising loading a software application into the memory of the device, wherein the software application comprises instructions for invoking a radio communication function in the firmware module by (i) generating a signal to the interrupt-interface logic to cause the interrupt-interface logic to assert the hardware-interrupt input line of the processor, and (ii) by identifying the radio communication function to be invoked to the interrupt routine, wherein the firmware module and the software application each have a respective interrupt vector table, wherein the device is configured to use the vector table of the firmware module when processing an interrupt, and wherein the firmware module is configured so that all interrupts that the firmware module is not programmed to handle itself are passed on to the software application.

2. The method of claim 1, wherein the firmware module is a pre-linked binary image.

3. The method of claim 1, comprising loading the software application to a predetermined application memory address.

4. The method of claim 1, wherein the software application contains no data relating to memory addresses in the firmware module.

5. The method of claim 1, wherein the input logic of the interrupt-interface logic is arranged to detect a signal in response to the processor writing to a predetermined memory address or register.

6. The method of claim 1, wherein the software application comprises instructions for passing a function identifier to the interrupt routine which identifies the radio communication function to be invoked.

7. The method of claim 6, wherein the software application comprises instructions for writing the function identifier to a shared memory location on the device, and wherein the interrupt routine comprises instructions for reading the function identifier from the shared memory location.

8. The method of claim 7, wherein an address for the shared memory location is hard-coded into the firmware module and the software application.

9. The method of claim 6, wherein the software application comprises instructions for passing the function identifier to the interrupt routine on a call stack.

10. The method of claim 1, wherein the software application comprises instructions for passing parameters for the radio communication function to the interrupt routine by writing the parameters to a call stack.

11. The method of claim 10, wherein the interrupt routine comprises instructions for reading the parameters from the stack and for passing them to the radio communication function.

12. The method of claim 1, wherein the firmware module contains the address of a call-back function in the software application, and wherein the interrupt routine comprises instructions for passing one or more memory addresses to the call-back function, and for receiving a function identifier or function parameter from the call-back function by reading data from the one or more memory addresses.

13. The method of claim 1, wherein the firmware module is arranged so that all the radio communication functions provided by the firmware module to the software application can be invoked by generating a signal to the interrupt-interface logic.

14. The method of claim 1, wherein the processor supports a plurality of interrupt priorities and wherein the device is arranged to execute some functions in the firmware module at a relatively high priority, and to execute other functions in the firmware module at a relatively low priority.

15. The method of claim 14, wherein the device is arranged to execute some functions in the software application at a relatively high priority, and to execute other functions in the software application at a relatively low priority, and wherein the high and low software-application priorities are interleaved with the high and low firmware-module priorities.

16. The method of claim 15, wherein the highest firmware priority level is higher than the highest software-application priority level.

17. The method of claim 1, wherein the device comprises memory protection logic arranged to intercept memory access instructions and to prevent the software application from reading or overwriting the firmware module.

18. An integrated-circuit radio communication device comprising:
a processor having a hardware-interrupt input line;
memory;
radio communication logic; and
interrupt-interface logic,
wherein:
the memory contains a firmware module comprising (i) instructions for controlling the radio communication logic according to a predetermined radio protocol, and (ii) an interrupt routine comprising instructions for receiving an identification of a radio communication function in the firmware module and for invoking the identified radio communication function;
the interrupt-interface logic comprises input logic for receiving a signal generated by software executing on the device, and output logic arranged to assert the hardware-interrupt input line of the processor in response to receiving a software-generated signal at the input logic;
the device is configured to invoke the interrupt routine in response to an assertion of the hardware-interrupt input line of the processor; and
the memory additionally contains a software application comprising instructions for invoking a radio communication function in the firmware module by generating a signal to the interrupt-interface logic to cause the interrupt-interface logic to assert the hardware-interrupt input line of the processor, and by identifying the radio communication function to be invoked to the interrupt routine.

19. The integrated-circuit radio communication device of claim 18, wherein the firmware module is a pre-linked binary image.

20. The integrated-circuit radio communication device of claim 18, wherein the input logic of the interrupt-interface logic is arranged to detect a signal in response to the processor writing to a predetermined memory address or register.

21. The integrated-circuit radio communication device of claim 18, wherein the software application contains no data relating to memory addresses in the firmware module.

22. The integrated-circuit radio communication device of claim 18, wherein the software application comprises instructions for passing a function identifier to the interrupt routine which identifies the radio communication function to be invoked.

23. The integrated-circuit radio communication device of claim 22, wherein the software application comprises instructions for writing the function identifier to a shared memory location on the device, and wherein the interrupt routine comprises instructions for reading the function identifier from the shared memory location.

24. The integrated-circuit radio communication device of claim 23, wherein an address for the shared memory location is hard-coded into the firmware module and the software application.

25. The integrated-circuit radio communication device of claim 22, wherein the software application comprises instructions for passing the function identifier to the interrupt routine on a call stack.

26. The integrated-circuit radio communication device of claim 18, wherein the software application comprises instructions for passing parameters for the radio communication function to the interrupt routine by writing the parameters to a call stack.

27. The integrated-circuit radio communication device of claim 26, wherein the interrupt routine comprises instructions for reading the parameters from the stack and for passing them to the radio communication function.

28. The integrated-circuit radio communication device of claim 18, wherein the firmware module contains the address of a call-back function in the software application, and wherein the interrupt routine comprises instructions for passing one or more memory addresses to the call-back function, and for receiving a function identifier or function parameter from the call-back function by reading data from the one or more memory addresses.

29. The integrated-circuit radio communication device of claim 18, wherein the firmware module is arranged so that all the radio communication functions provided by the firmware module to the software application can be invoked by generating a signal to the interrupt-interface logic.

30. The integrated-circuit radio communication device of claim 18, wherein the processor supports a plurality of interrupt priorities and wherein the device is arranged to execute some functions in the firmware module at a relatively high priority, and to execute other functions in the firmware module at a relatively low priority.

31. The integrated-circuit radio communication device of claim 30, wherein the device is arranged to execute some functions in the software application at a relatively high priority, and to execute other functions in the software application at a relatively low priority, and wherein the high and low software-application priorities are interleaved with the high and low firmware-module priorities.

32. The integrated-circuit radio communication device of claim 31, wherein the highest firmware priority level is higher than the highest software-application priority level.

33. The integrated-circuit radio communication device of claim 18, wherein the firmware module and the software application each has a respective interrupt vector table, wherein the device is configured to use the vector table of the firmware module when processing an interrupt, and wherein the firmware module is configured so that all interrupts that the firmware module is not programmed to handle itself are passed on to the software application.

34. The integrated-circuit radio communication device of claim 18, wherein the device comprises memory protection logic arranged to intercept memory access instructions and to prevent the software application from reading or overwriting the firmware module.

35. A method of configuring an integrated-circuit radio communication device, wherein:

the device comprises memory, radio communication logic, interrupt-interface logic, and a processor having a hardware-interrupt input line;

the interrupt-interface logic comprises input logic for receiving a signal generated by software executing on the device, and output logic arranged to assert the hardware-interrupt input line of the processor in response to receiving a software-generated signal at the input logic; and the device is configured to invoke an interrupt routine in response to an assertion of the hardware-interrupt input line of the processor, the method comprising:

loading a firmware module into the memory of the device, wherein the firmware module comprises (i) instructions for controlling the radio communication logic according to a predetermined radio protocol, and (ii) an interrupt routine comprising instructions for receiving an identification of a radio communication function in the firmware module and for invoking the identified radio communication function; and loading a software application into the memory of the device, wherein the software application comprises instructions for invoking a radio communication function in the firmware module by generating a signal to the interrupt-interface logic to cause the interrupt-interface logic to assert the hardware-interrupt input line of the processor, and by identifying the radio communication function to be invoked to the interrupt routine.

36. The method of claim 35, wherein the firmware module is a pre-linked binary image.

37. The method of claim 35, wherein the software application contains no data relating to memory addresses in the firmware module.

38. The method of claim 35, wherein the input logic of the interrupt-interface logic is arranged to detect a signal in response to the processor writing to a predetermined memory address or register.

39. The method of claim 35, wherein the software application comprises instructions for passing a function identifier to the interrupt routine which identifies the radio communication function to be invoked.

40. The method of claim 35, wherein the firmware module is arranged so that all the radio communication functions provided by the firmware module to the software application can be invoked by generating a signal to the interrupt-interface logic.

41. The method of claim 35, wherein the device comprises memory protection logic arranged to intercept memory access instructions and to prevent the software application from reading or overwriting the firmware module.

* * * * *